United States Patent
Haggag et al.

(10) Patent No.: US 10,796,112 B2
(45) Date of Patent: Oct. 6, 2020

(54) PROTOCOL LAYER COORDINATION OF WIRELESS ENERGY TRANSFER SYSTEMS

(71) Applicant: Teslonix Inc., Ottawa (CA)

(72) Inventors: Mohamed Nasr Mohamed Talaat Mahmoud Haggag, Nepean (CA); Vytautas Robertas Kezys, Hamilton (CA); Boris Spokoinyi, Ottawa (CA)

(73) Assignee: Teslonix Inc., Ottawa (CA)

( * ) Notice: Subject to any disclaimer, the term of this patent is extended or adjusted under 35 U.S.C. 154(b) by 0 days.

(21) Appl. No.: 16/420,012

(22) Filed: May 22, 2019

(65) Prior Publication Data
US 2019/0362108 A1    Nov. 28, 2019

Related U.S. Application Data

(60) Provisional application No. 62/677,146, filed on May 28, 2018.

(51) Int. Cl.
*G06K 7/10* (2006.01)
*G06K 19/07* (2006.01)

(52) U.S. Cl.
CPC ..... *G06K 7/10158* (2013.01); *G06K 19/0708* (2013.01)

(58) Field of Classification Search
CPC .................................................. G06K 7/10158
USPC .......................................... 235/451; 320/108
See application file for complete search history.

(56) References Cited

U.S. PATENT DOCUMENTS

| | | |
|---|---|---|
| 3,510,788 A | 5/1970 | Wollesen |
| 3,534,294 A | 10/1970 | Auer |
| 4,103,260 A | 7/1978 | Buchman |
| 4,241,316 A | 12/1980 | Knapp |
| 4,348,676 A | 9/1982 | Tom |
| 4,496,909 A | 1/1985 | Knapp |

(Continued)

FOREIGN PATENT DOCUMENTS

| | | |
|---|---|---|
| JP | 2011199975 A | 10/2011 |
| WO | 2007084716 A3 | 12/2007 |
| WO | 2014102828 A2 | 7/2014 |

OTHER PUBLICATIONS

EPO Office Action for Application No. 15 855 996.3, dated Nov. 26, 2018; 5 pages.

(Continued)

*Primary Examiner* — Allyson N Trail
(74) *Attorney, Agent, or Firm* — Atesa Legal PLLC

(57) ABSTRACT

A method for protocol layer coordination of wireless energy transfer systems includes defining, by a master Internet of Things Access Point (IoTA), a set of configuration parameters. The master IoTA is one of a plurality of IoTAs. Each IoTA includes a controller in communication with a Power Access Point (PAP), an intercommunication radio and a Radio Frequency Identification (RFID) transceiver. The PAP is configured to energize an RFID tag, the intercommunication radio is configured to communicate between the master IoTA and a slave IoTA, and the RFID transceiver is configured to communicate with the RFID tag. Both the master IoTA and the slave IoTA are configured with the set of configuration parameters, transmitted by the master IoTA. The slave IoTA transmits an RFID command in response to the slave IoTA receiving the RFID request, from the master IoTA.

20 Claims, 7 Drawing Sheets

(56) References Cited

U.S. PATENT DOCUMENTS

| | | |
|---|---|---|
| 4,503,403 A | 3/1985 | Taylor et al. |
| 4,710,977 A | 12/1987 | Lemelson |
| 5,218,366 A | 6/1993 | Cardamone et al. |
| 5,400,036 A | 3/1995 | Kochiyama et al. |
| 5,883,829 A | 3/1999 | Wagt |
| 6,184,696 B1 | 2/2001 | White et al. |
| 6,798,716 B1 | 9/2004 | Charych |
| 6,882,227 B2 | 4/2005 | Barry et al. |
| 6,967,462 B1 | 11/2005 | Landis |
| 7,068,991 B2 | 6/2006 | Parise |
| 7,482,273 B1 | 1/2009 | Klein et al. |
| 7,566,889 B1 | 7/2009 | Klein et al. |
| 7,626,134 B1 | 12/2009 | Klein et al. |
| 7,711,441 B2 | 5/2010 | Tillotson |
| 8,232,748 B2 | 7/2012 | Treas et al. |
| 8,258,882 B2 | 9/2012 | Shibasaki et al. |
| 8,384,314 B2 | 2/2013 | Treas et al. |
| 8,760,743 B2 | 6/2014 | Lal et al. |
| 8,948,847 B2 | 2/2015 | Afsar et al. |
| 9,124,125 B2 | 9/2015 | Leabman et al. |
| 9,384,376 B2 | 7/2016 | Sabesan et al. |
| 9,787,103 B1 | 10/2017 | Leabman et al. |
| 10,256,678 B2 | 4/2019 | Wight et al. |
| 2006/0001509 A1 | 1/2006 | Gibbs |
| 2006/0108421 A1 | 5/2006 | Becker et al. |
| 2008/0068174 A1 | 3/2008 | Al-Mahdawi |
| 2008/0231449 A1 | 9/2008 | Moshfeghi |
| 2008/0275572 A1 | 11/2008 | Tillotson |
| 2009/0315412 A1 | 12/2009 | Yamamoto et al. |
| 2010/0188027 A1 | 7/2010 | Treas et al. |
| 2010/0315045 A1 | 12/2010 | Zeine |
| 2011/0080267 A1 | 4/2011 | Clare et al. |
| 2012/0162010 A1 | 6/2012 | Georgiadis et al. |
| 2012/0313577 A1 | 12/2012 | Moes et al. |
| 2013/0016814 A1 | 1/2013 | Treas et al. |
| 2013/0137455 A1 | 5/2013 | Kia et al. |
| 2013/0303901 A1 | 11/2013 | Afsar et al. |
| 2014/0043487 A1 | 2/2014 | Marandos et al. |
| 2014/0078568 A1 | 3/2014 | Lal et al. |
| 2014/0080264 A1 | 3/2014 | Chan et al. |
| 2014/0138432 A1 | 5/2014 | Park et al. |
| 2014/0175893 A1 | 6/2014 | Sengupta et al. |
| 2014/0266480 A1 | 9/2014 | Li et al. |
| 2014/0354064 A1 | 12/2014 | Tseliakhovich |
| 2014/0375262 A1* | 12/2014 | Yamaguchi ............ H01Q 7/06 320/108 |
| 2015/0022009 A1 | 1/2015 | Leabman et al. |
| 2015/0318730 A1 | 11/2015 | Bhargava et al. |
| 2015/0340875 A1 | 11/2015 | Prasad |
| 2016/0042206 A1 | 2/2016 | Pesavento et al. |
| 2016/0126753 A1 | 5/2016 | Wight et al. |
| 2016/0268842 A1* | 9/2016 | Wang ...................... H02J 9/005 |
| 2017/0116443 A1 | 4/2017 | Bolic et al. |
| 2017/0149294 A1 | 5/2017 | Wight et al. |
| 2017/0287626 A1* | 10/2017 | Larson .................... H02J 7/025 |
| 2017/0288737 A1* | 10/2017 | Lee ........................ G06Q 20/34 |
| 2019/0181691 A1 | 6/2019 | Wight et al. |
| 2019/0386505 A1* | 12/2019 | Lin ......................... H04W 12/08 |

OTHER PUBLICATIONS

European Patent Office Search Report for 15855996.3, nationalized from PCT/IB2015002192, dated Feb. 13, 2018; 10 pages.

Final Office Action for U.S. Appl. No. 14/923,847, dated Nov. 8 2018; 21 pages.

GS1 EPCGLOBAL Inc., "EPC Radio-Frequency Identity Protocols Generation-2 UHF RFID," Specification for RFID Air Interface Protocol for Communications at 860 Mhz-960 Mhz, Version 2.0.1 Ratified; 152 pages.

Jing Feng et al, "Energy-efficient transmission for beamforming in wireless sensor networks," Sensor Mesh and Ad Hoc Communications and Networks (SECON), 2010 7th Annual IEEE Communications Society Conference on. IEEE, 2010; 9 pages.

Korean Non-Final Office Action for 10-2017-7011095, dated Jun. 8, 2018; 8 pages.

Non-Final Office Action dated Feb. 19, 2019 for U.S. Appl. No. 14/923,847, 17 pages.

Non-Final Office Action dated May 11, 2018 for U.S. Appl. No. 14/923,847, 16 pages.

Notice of Allowance for U.S. Appl. No. 15/424,752, dated Nov. 16 2018; 10 pages.

PCT International Search Report and Written Opinion for PCT/IB2015/002192, dated Jan. 21, 2016; 8 pages.

PCT International Search Report and Written Opinion for PCT/IB2017/000162, dated Jun. 16, 2017; 8 pages.

PCT International Search Report and Written Opinion for PCT/IB2017/000174, dated Jun. 9, 2017; 10 pages.

Stefan Berger et al., "Carrier Phase Synchronization of Multiple Distributed Nodes in a Wireless Network," Signal Processing Advances in Wireless Communications, 2007, SPAWC 2007, IEEE 8th Workshop on. IEEE 2007; 5 pages.

Wight et al., "A Microstrip and Stripline Crossover Structure," IEEE Transactions on Microwave Theory and Techniques, May 1976; 1 page.

Notice of Allowance for U.S. Appl. No. 14/923,847, dated Jun. 25, 2019, revised Aug. 5, 2019; 7 pages.

Non-Final Office Action dated Jul. 17, 2019 for U.S. Appl. No. 15/398,641, 21 pages.

* cited by examiner

PROTOCOL LAYER COORDINATION OF WIRELESS ENERGY TRANSFER SYSTEMS

CROSS-REFERENCE TO RELATED APPLICATIONS

This application is a utility application claiming priority to co-pending U.S. Provisional Application Ser. No. 62/677,146 filed on May 28, 2018 entitled "PROTOCOL LAYER COORDINATION OF WIRELESS ENERGY TRANSFER SYSTEMS," the entirety of which is incorporated by reference herein.

FIELD

This disclosure relates generally to wireless energy transfer, and more specifically to protocol layer coordination of wireless energy transfer systems.

BACKGROUND

Increased processing and connectivity capabilities of portable devices have resulted in a corresponding increase in the energy consumption of these devices. Furthermore, there are practical physical limits as to how much energy a portable device can store, thus necessitating frequent charging of these devices. Tethered solutions to powering portable devices are limited in part due to a lack of standardization of the connectors between the power cable and device, the weight and reliability of the charging cables, restrictions on the operating environment (e.g., underwater or hazardous areas), and the general constraints on mobility that tethered solutions impose.

Wireless charging of portable devices, has previously been limited to short distances (e.g., on the order of centimeters), by near-field techniques such as inductive or capacitive coupling. Far-field techniques that use lasers or microwave beams involve dangerously high power levels, particularly in an environment including humans. Lasers and microwave beams are also typically limited to line-of-sight applications.

Improvements in the capabilities of portable devices have also helped enable an environment of an Internet of Things (IoT) wherein large and dense deployments of devices could collectively share information. However, previous solutions have been limited in their ability to efficiently power devices in an IoT environment, where the devices require mobility, and have significantly different power consumption requirements. Similarly, increased usage of Radio Frequency Identification (RFID) tags requires an efficient way of powering devices in a mobile environment without tethering, using dangerously high levels of power, or imposing undue restrictions on the placement of charging stations used to charge the RFID tags.

BRIEF SUMMARY

As will be appreciated, embodiments as disclosed herein include at least the following. In one embodiment, a method for protocol layer coordination of wireless energy transfer systems comprises defining, by a master Internet of Things Access Point (IoTA), a set of configuration parameters, the master IoTA being one of a plurality of IoTAs, each IoTA comprising a controller in communication with a Power Access Point (PAP), an intercommunication radio and a Radio Frequency Identification (RFID) transceiver, the PAP configured to energize an RFID tag, the intercommunication radio configured to communicate between the master IoTA and a slave IoTA, and the RFID transceiver configured to communicate with the RFID tag. The master IoTA transmits the set of configuration parameters. In both the master IoTA and the slave IoTA, the respective PAP and the respective RFID transceiver are configured with the set of configuration parameters. The intercommunication radio of the master IoTA transmits an RFID request. The RFID transceiver of the slave IoTA transmits an RFID command in response to the slave IoTA receiving the RFID request.

In another embodiment, a system for protocol layer coordination of wireless energy transfer systems comprises a first Internet of Things Access Point (IoTA) of a plurality of IoTAs, wherein each of the plurality of IoTAs comprise a controller in communication with a Power Access Point (PAP), an intercommunication radio and a Radio Frequency Identification (RFID) transceiver, the intercommunication radio configured to communicate between at least two IoTAs, and the RFID transceiver configured to communicate with the RFID tag. A second IoTA of the plurality of IoTAs is physically separated from the first IoTA. An RFID tag is configured to be energized by the respective PAP of at least one of the plurality of IoTAs. Wherein, the first IoTA is configured to transmit with a first intercommunication radio of the first IoTA to the second IoTA, a set of configuration parameters to configure a second PAP and a second RFID transceiver of the second IoTA to match a configuration of a respective first PAP and a respective first RFID transceiver of the first IoTA. The first IoTA is configured to transmit with a first intercommunication radio of the first IoTA, an RFID request to the second IoTA. The second IoTA is configured to synchronize a second clock of the second IoTA to a first clock of the first IoTA using a packet frame of the RFID request. The first RFID transceiver and the second RFID transceiver are configured to transmit a respective RFID command to the RFID tag in response to the RFID request.

In another embodiment, a system for protocol layer coordination of wireless energy transfer systems comprises a first Internet of Things Access Point (IoTA) of a plurality of IoTAs, wherein each of the plurality of IoTAs comprise a controller in communication with a Power Access Point (PAP), an intercommunication radio and a Radio Frequency Identification (RFID) transceiver, the intercommunication radio configured to communicate between at least two IoTAs, and the RFID transceiver configured to communicate with the RFID tag. A second IoTA of the plurality of IoTAs, is physically separated from the first IoTA. An RFID tag is configured to be energized by the PAP of at least one of the plurality of IoTAs. Wherein, the first IoTA is configured to transmit with a first intercommunication radio of the first IoTA to the second IoTA, a set of configuration parameters to configure a second PAP and a second RFID transceiver of the second IoTA to match a configuration of a respective first PAP and a respective first RFID transceiver of the first IoTA. The first IoTA and the second IoTA are configured to receive a tag response from the RFID tag, wherein the RFID tag transmits the tag response in response to an RFID command received by the RFID tag from at least one of the plurality of IoTAs. The first IoTA is configured to receive the tag response from the second IoTA with the first intercommunication radio, and to analyze the respective tag response received from the RFID tag and from the second IoTA with a first controller of the first IoTA, to determine a result.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a state timing diagram according to a first embodiment.

Figure 5:
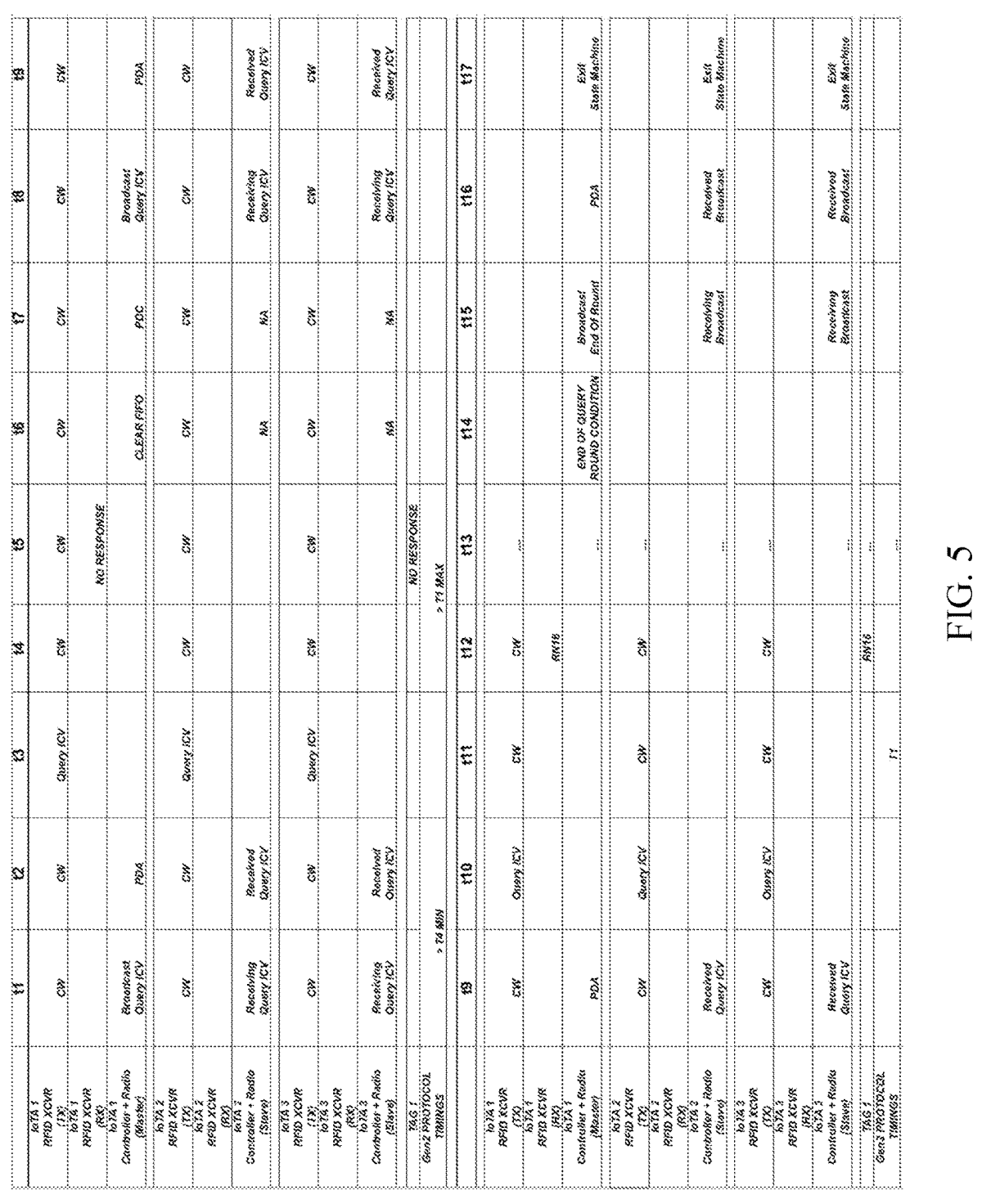

FIG. 5 is a state timing diagram according to a first architecture embodiment showing the protocol layer coordination for a non-responsive RFID tag during a read sequence.

Figure 6:
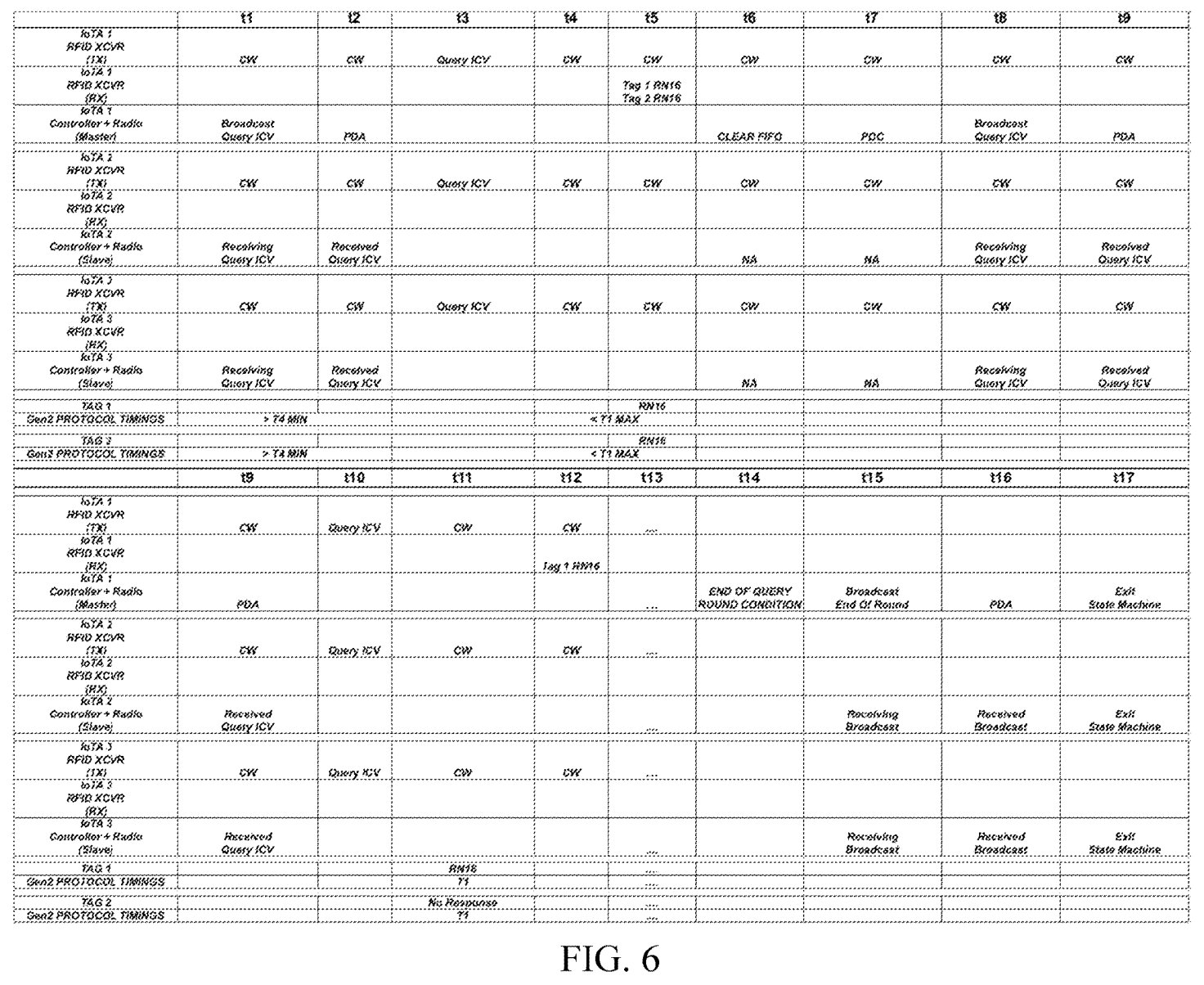

FIG. 6 is a state timing diagram according to a first architecture embodiment showing the protocol layer coordination for a read collision during a read sequence of an RFID tag.

DETAILED DESCRIPTION

Figure 1:
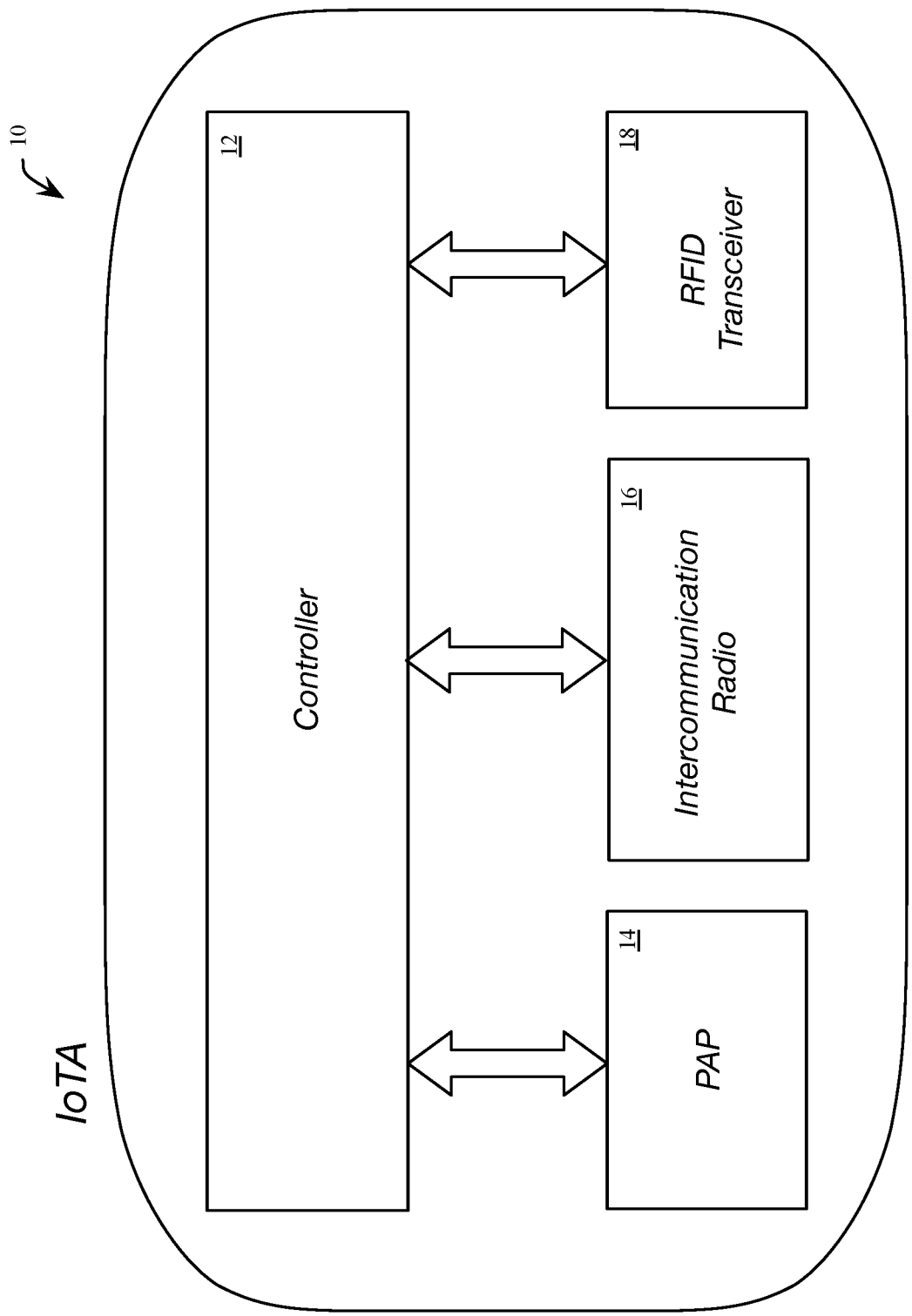
FIG. 1 is a functional block view of an Internet of Things Access Point.

A protocol layer coordination method described herein provides for the coordination of Internet of Things Access Points (IoTA) at the protocol layer through interrogator synchronization and transmission bit alignment. An IoTA, achieves coherent power by combining N number of Power Access Points (PAPs) at an RFID tag (e.g., sensor) location. This disclosure discusses in detail, the system and methods used to achieve systematic synchronization and alignment at the protocol level built on top of the PAP coherent combination to achieve maximum efficiency in interrogating RFID tags. This distances and to fully exploit the advantages of coherent power combination at the RFID dual level combination technology allows the IoTAs to energize (e.g., power up), RFID tags at greater tag level by also synchronizing and aligning at the protocol level.

SYMBOLS AND ABBREVIATED TERMS

| Term | Description |
| --- | --- |
| EPC | Electronic Product Code |
| CW | Continuous wave |
| Query ICV | Gen2 Query Inventory command variant |
| Gen2 | EPCglobal Class 1 Generation 2 |
| PDC | IoTA Programmable Delay For Cancellation |
| PDA | IoTA Programmable DELAY for alignment |
| RN16 | Tag's 16-bit random or pseudo-random number |
| ACK | Gen2 Acknowledge command |
| T1 | Time from Interrogator transmission to Tag response for an immediate Tag reply |
| T2 | Time from Tag response to Interrogator transmission |
| T3 | Time an Interrogator waits, after T1, before it issues another command |
| T4 | Minimum time between Interrogator commands |
| XCVR | Transceiver |
| uC | micro-controller |
| PAP | Teslonix Power Access Point |
| IoTA | Teslonix Internet of Things Access point |
| BLF | Backscatter-link frequency |
| TX | Transmit |
| RX | Receive |

At the protocol level, coordination includes two tasks, namely synchronization on transmit and coordinate on receive. "Synchronization on transmit" means that the multiple transmitters communicating with the tags/sensors according to their protocol need to closely align their transmission—the bits communicated from all transmitters need to be accurately aligned down to the sub-microsecond resolution. On the other hand, "coordinate on receive" means that all IoTAs gather their received responses from the sensors/tags and coordinate/arbitrate the results together to achieve the best efficiency for the whole system.

The disclosure will discuss the coordination using synchronization and alignment at the protocol layer level in general and will use the standard protocol defined by the EPCglobal Class 1 Generation 2 in detail for illustration.

EPC is an acronym for Electronic Product Code and is currently the industrial global standard for Radio Frequency Identification that replaced the UPC or Universal Product Code standard. The EPC standard is based on Interrogators (e.g., RFID Gen 2 Reader), and EPC tags. The standard is an Interrogator talk-first standard with the tags using passive-backscatter to respond. The uses of the Gen2 standard and RFID technology is consistently expanding, the range of RFID tags or sensors whether active or passive range from simple passive RFID tags to sensors capable of measuring multiple parameters at the same time.

System Architecture:

With reference to FIG. 1, the IoTA unit 10 includes the following functional modules:

- Controller (uC) 12: Each IoTA has a control unit that handles the low-level protocol state-machine as well as the system level interactions between the different modules. The controller is in charge of controlling the intercommunications radio and the RFID transceiver modules as well as handle the configuration of the PAP module as well as the protocol and system level methods.
- PAP 14: A Power Access Point (PAP) is the transmission module of the IoTA. The PAP unit provides precise and robust transmission frequency, phase and power control.
- Intercommunication Radio 16: Each radio is used to broadcast and receive commands during the RFID system's state machine to synchronize each IoTA on the protocol level.
- RFID Transceiver 18: Each IoTA has a RFID reader chip, connected to the uC. The transceiver provides the uC direct control over the protocol layer configurations and operations.

Examples of protocol layer configurations include Backscatter-Link Frequency (BLF), Miller and Tari. BLF uses a link rate from the tag to the IoTA reader (e.g., RFID transceiver), specified by the respective interrogating IoTA. Miller modulation is a data encoding method used by the tags. In one embodiment, the Miller modulation of a sub-carrier uses a data rate for the backscattered data as specified by the interrogating IoTA. Tari is a reference time interval for signaling between the interrogating IoTA and a tag.

In various embodiments, the PAP has two operational modes relevant to the RFID environments. The first operational mode is based on a frequency offset. In this mode each slave IoTA PAP is configured to work at a frequency offset to the master IoTA PAP and the other slaves as well. The different frequency offsets between all of the deployed IoTAs help create multiple energy bubbles that continuously move in the coverage area in a random manner at a pace relative to the frequency offsets between the deployed IoTAs.

The second operational mode is based on phase offsets. In this mode each slave IoTA PAP is configured to work at a phase offset to the master IoTA PAP and the other slaves as well. The phase offsets are stepped to create multiple energy bubbles that step through the coverage area in a random manner. Other modes are included in other embodiments, including without limit, modes to align polarization.

Theory of Operation:

This complete system is based on having multiple IoTAs deployed together with the IoTAs working in a coordinated manner to achieve maximum efficiency. As mentioned above, each IoTA contains a Radio module, a RFID transceiver and a Power access point (PAP) module.

In one embodiment, each IoTA is tested and characterized (e.g., the crystal oscillator clock rate amongst other parameters), before being deployed to the field. The characteristics of each IoTA is thus know and saved in a gateway running the wireless energy transfer system. In one embodiment, during operation, a respective communication link between each master and its corresponding slaves is verified for reliability for forward communication checks, as long as a packet error rate of the respective communication link is below a predefined threshold.

In one embodiment, each of the slave IoTAs align themselves to the master to perform time and bit level adjustments. The slaves listen to a signal from the master and use the received signal to align their crystal oscillators (OCXO) to within a fraction of a Hertz of the master's OCXO. Accordingly, a variance or skew in the OCXO clock rate characteristics of each IoTA is negligible. During operation, the master continuously broadcasts packets with information of the exact bits to transmit next through the RFID transceiver, and the slaves use the frame of the broadcasted packet to synchronize themselves to the master to achieve time and bit alignment. In another embodiment, more precise synchronization occurs by allowing the master to wait for feedback from the slaves to better align the internal timers and counters of the master's controller (e.g., an MCU within the controller).

To achieve peak performance at the area of deployment, the deployed IoTAs are dispersed spatially, (ideally in the corners of the area to be covered), to establish optimal coverage. The coordinated system works in a round-robin manner, where all the IoTAs connected to the gateway are configured to operate as slaves or repeaters with one IoTA switched at a time as the protocol master to gain spatial diversity.

The protocol layer coordination has two devised system architectures that can achieve coherent combining on the protocol layer level. Embodiments of these two architectures will be discussed in detail below.

The first embodiment, (system architecture 1), is based on a single receiver system where only the current protocol master IoTA is programmed to use the receiver (RX) part of the transceiver to carry out the Gen2 tag/sensor interrogation duties, while a second embodiment, (system architecture 2), is based on a multi-receiver system where all IoTAs are programmed to use the RX part of their transceiver, but the Gen2 tag/sensor interrogation is defined by only the protocol master IoTA. The table below shows a summary of the difference between the two architectures in terms of module configuration.

TABLE 1

Architecture 1 vs. Architecture 2

| Configuration | Architecture 1 | | Architecture 2 | |
| --- | --- | --- | --- | --- |
| | Master | Slave | Master | Slave |
| Inter-Radio | TX | RX | TX/RX | TX/RX |
| RFID transceiver | TX/RX | TX only | TX/RX | TX/RX |
| PAP | N/A | N/A | N/A | N/A |

In both architectures however the protocol master IoTAs handles all the decision making in the protocol coordination. This means that the master IoTA is responsible for defining the configuration of the Gen2 protocol parameters and the information to be sent to the RFID tags/sensors. The master IoTA is also tasked with communicating the decisions to the other IoTAs through the intercommunication radio as well as handle and maintain the time syncing of the RFID transceivers down to the bit level.

First Embodiment (System Architecture 1)

As mentioned above, in architecture 1, only the protocol master IoTA works as a RFID interrogator while all the slaves work as RFID repeaters. The manner in which the master is chosen can be pre-programmed or chosen manually by the user, or the IoTAs can go into arbitration mode where each is assigned a turn based on its unit identification (UID).

Figure 2:
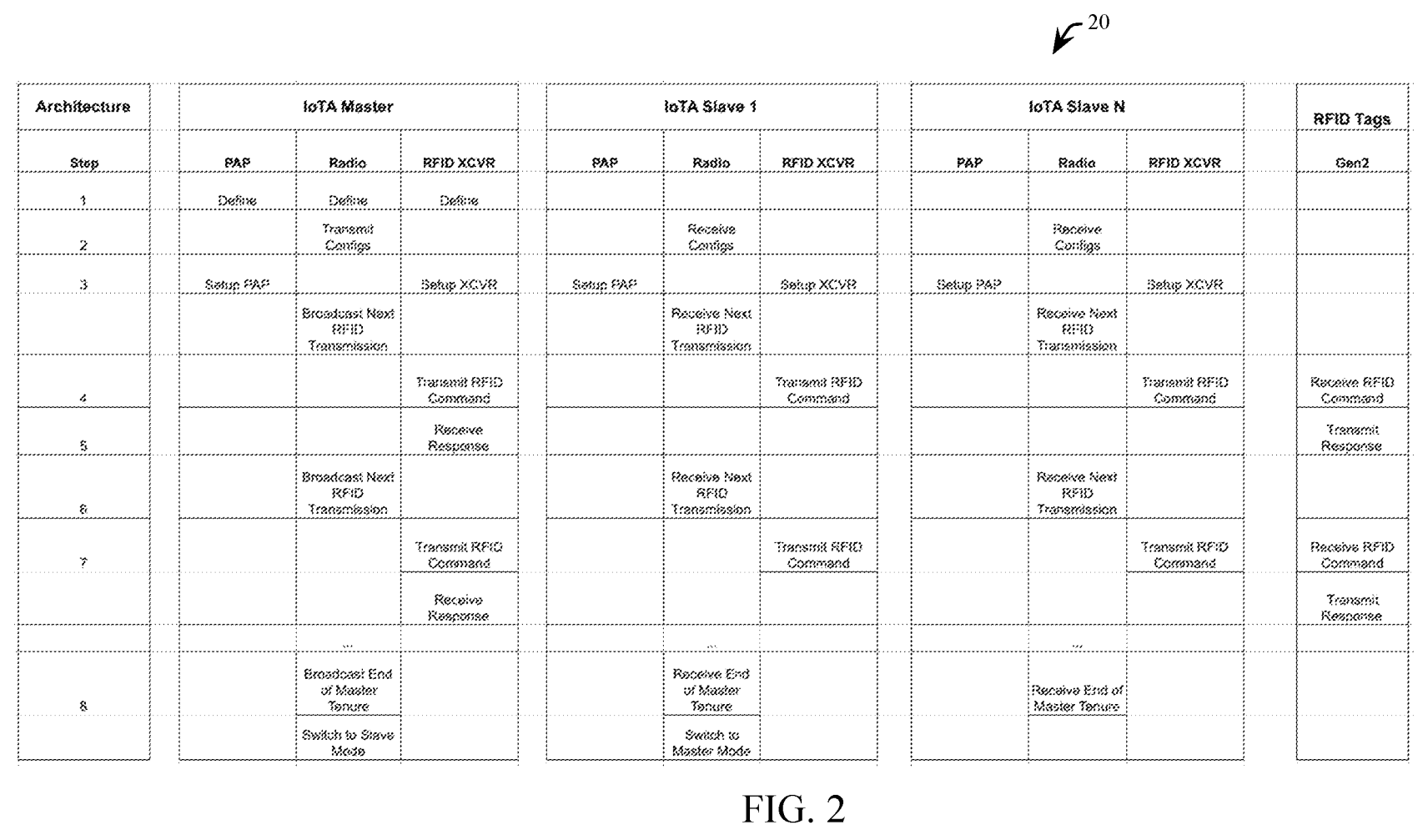

Referring to FIG. 2, the process steps 20 for system architecture 1 to achieve protocol layer alignment proceeds as follows:

Step 1. Master IoTA defines the protocol (e.g., EPC gen2, or sensor specific read/write) to be used and the configuration (e.g., Tari, Miller, or BLF) as well as the transmission configuration (e.g., Frequency, or Phase).

Step 2. All of these parameters are populated into radio messages and broadcasted over the intercommunication radio to the rest of the deployed IoTAs, who are in slave mode and subsequently set to be in radio receive mode for instructions from the master at all times.

Step 3. Once the parameters are communicated, and each IoTA is configured as required, the protocol master IoTA broadcasts another radio message detailing the next RFID command to be used and time syncing all the IoTAs as to the start of the next transmission.

Step 4. Being in time sync, all the IoTAs will proceed to transmit the RFID command in a coordinated manner, with all transmissions aligned accurately to the bit level.

Step 5. With only the protocol master being set up as a full RFID interrogator, only the protocol master IoTA will be able to decode the response coming back for the RFID tag/sensor. Depending on the decoded response, the master will decide the next RFID message to be transmitted.

Step 6. After the next message is decided the protocol master IoTA will proceed to broadcast the radio message detailing the next RFID command to be used and time syncing all the IoTAs as to the start of the next transmission.

Step 7. Being in time sync, all the IoTAs will proceed to transmit the RFID command in a coordinated manner, with all transmissions aligned accurately to the bit level.

Step 8. If at any point the protocol master IoTA decides that no further transmissions are required, the IoTA will proceed to broadcast a radio message over the intercommunication radio signaling the end of its tenure as master and switching itself to slave mode. The IoTA with the next number in sequence as determined beforehand, (or through an external gateway/control entity, not shown), will proceed to switch to master mode after it receives this radio transmission. All other IoTAs will stay in slave mode and idle until further instruction from the master IoTA.

Figure 3:
FIG. 3 is a state timing diagram according to a second embodiment.

Referring to FIG. 3, the process steps 30 for system architecture 2 to achieve protocol layer alignment proceeds as follows:

Step 1. Same as with system architecture 1.
Step 2. Same as with system architecture 1.
Step 3. Same as with system architecture 1.
Step 4. Same as with system architecture 1.
Step 5. With all IoTAs being set up as a RFID interrogators, all IoTAs will be able to decode the response coming back for the RFID tag/sensor. In an environment with multiple RFID tags/sensors especially in the EPC gen2 protocol with the IoTAs distributed apart in the deployment environment, it is highly likely that one or more of the IoTAs will receive responses from different tags/sensors than the rest of the IoTAs. In all scenarios, the protocol master is tasked with the arbitration phase where using a time slotted sequence the master IoTA proceeds to interrogate each IoTA over radio communication regarding the response it received. In one example embodiment, the responses from the tags/sensors include samples of Radio Frequency (RF) waveforms, samples of baseband waveforms, and soft-decoded data bits or hard-decoded data bits. In an example embodiment, arbitration of the responses from the tags/sensors includes coherently combining RF or baseband waveforms. After collecting all the responses received by all IoTAs, the protocol master IoTA will proceed to decide the best response to pursue and determine the next RFID command to send.
Step 6. Same as with system architecture 1.
Step 7. Same as with system architecture 1.
Step 8. Same as with system architecture 1.

scenarios, time slots (e.g., t1 for timeslot 1) are arranged in vertical columns. For example, FIG. 4 shows time slots t1 to t22 (with t12 repeated for clarity), FIG. 5 and FIG. 6 show time slots t1 to t17 (with t9 repeated for clarity).

Figure 4:
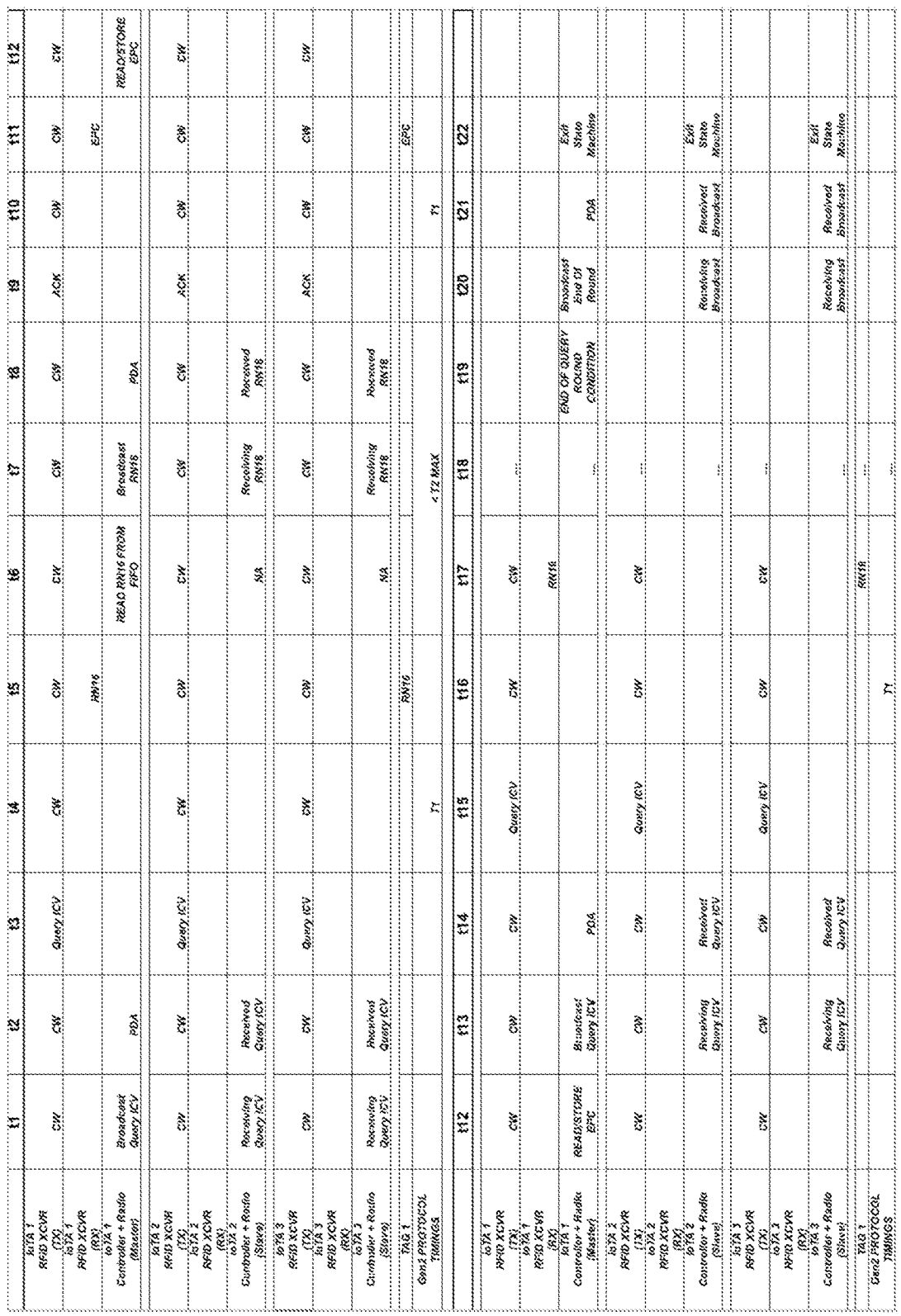
FIG. 4 is a state timing diagram according to a first architecture embodiment showing the protocol layer coordination for a successful read sequence of an RFID tag.

Examples of IoTA Protocol Layer Coordination for Architecture 1:

The first example illustrated in FIG. 4 is for three deployed IoTAs and one RFID tag, the example will show the protocol layer coordination of the three IoTAs using system architecture 1 to read the RFID tag. The example illustrates a successful read sequence in which the 3 IoTA system queries the tag using the Gen2 protocol and the tag successfully responds with the RN16 and later the EPC to complete the successful read sequence.

The second example illustrated in FIG. 5 is again for 3 deployed IoTAs and one RFID tag, in this example however the illustration is for the protocol layer coordination of the three IoTAs using system architecture 1 in a no response scenario from the RFID tag. Example 2 illustrates a no response sequence where the 3 IoTA system queries the tag using the Gen2 protocol but the does not respond.

The third example illustrated in FIG. 6 is for 3 deployed IoTAs and two RFID tags, in this example the illustration is for the protocol layer coordination of the three IoTAs using system architecture 1 in a collision scenario from the RFID tags. In the example the 3 IoTA system queries the RFID tag population consisting of 2 RFID tags and in response both RFID tags reply with their RN16, this promotes the protocol master IoTA to detect a collision and using its slotted query method decides on the next RFID command to be transmitted.

Figure 7:
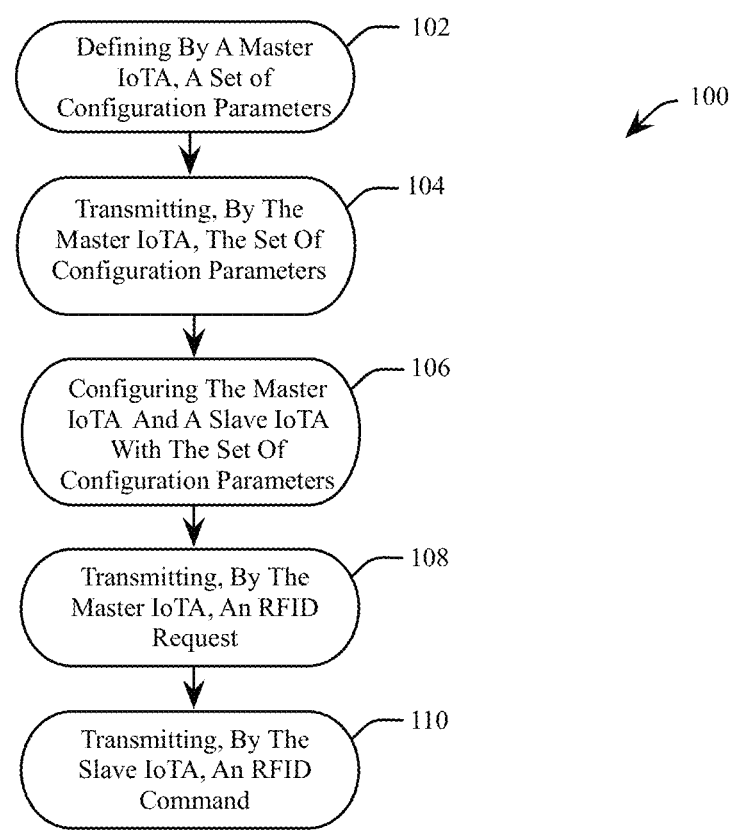
FIG. 7 is a flowchart representation of a method for protocol layer coordination of wireless energy transfer systems in accordance with an example embodiment of the present disclosure.

With reference to FIG. 7, an example embodiment of a method 100 for protocol layer coordination of wireless energy transfer systems. At 102, a master IoTA defines, a set of configuration parameters. At 104, the master IoTA transmits the set of configuration parameters. At 106, the master IoTa and a slave IoTA are configured with the set of configuration parameters. At 108, the master IoTA transmits an RFID request. At 110, the slave IoTA transmits an RFID command.

Gen2 Related Variables and Restrictions:

The following table below explains briefly some Gen2 specified timing terms that are relevant for all RFID functions mentioned in this disclosure:

| Variable | Description | Min (us) | | Max (us) | |
| --- | --- | --- | --- | --- | --- |
| T1 | Time between end of reader transmission and beginning of tag response | BLF 40 | 238 | BLF 40 | 262 |
| | | BLF 160 | 58 | BLF 160 | 67 |
| | | BLF 256 | 58 | BLF 256 | 67 |
| T2 | Time between end of tag transmission and beginning of reader response | BLF 40 | 75 | BLF 40 | 500 |
| | | BLF 160 | 18.75 | BLF 160 | 125 |
| | | BLF 256 | 11.71875 | BLF 256 | 78.125 |
| T3 | Time between end of tag response and beginning of reader next command | BLF 40 | 0 | BLF 40 | N/A |
| | | BLF 160 | 0 | BLF 160 | N/A |
| | | BLF 256 | 0 | BLF 256 | N/A |
| T4 | Time between two consecutive reader commands | BLF 40 | 125 | BLF 40 | — |
| | | BLF 160 | 125 | BLF 160 | — |
| | | BLF 256 | 125 | BLF 256 | — |

Time Alignment (State-Machine):

In order to fully explain the methods and system level mechanisms devised to handle the protocol layer coordination, three examples in the Gen2 RFID domain will be used to illustrate the state-machine of the IoTA from a system level in time slot diagram. For illustration, the three scenarios (see FIG. 4, FIG. 5 and FIG. 6) each are for a 3 IoTA system architecture 1 type deployment. For each of the three Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protocol layer coordination of wireless energy transfer systems comprising:
   defining, by a master Internet of Things Access Point (IoTA), a set of configuration parameters, the master IoTA being one of a plurality of IoTAs, each IoTA comprising a controller in communication with a Power Access Point (PAP), an intercommunication radio and a Radio Frequency Identification (RFID) transceiver, the PAP configured to energize an RFID tag, the intercommunication radio configured to communicate between the master IoTA and a slave IoTA, and the RFID transceiver configured to communicate with the RFID tag;
   transmitting, by the master IoTA, the set of configuration parameters;
   configuring with the set of configuration parameters, in both the master IoTA and the slave IoTA, the respective PAP and the respective RFID transceiver;
   transmitting with the intercommunication radio of the master IoTA, an RFID request; and
   transmitting with the RFID transceiver of the slave IoTA, an RFID command in response to the slave IoTA receiving the RFID request.

2. The method of claim 1 further comprising transmitting by the RFID tag, a tag response in response to the RFID command received by the RFID tag.

3. The method of claim 1 further comprising transmitting the RFID command with each of the plurality of IoTAs.

4. The method of claim 1 further comprising synchronizing a slave clock of the slave IoTA to a master clock of the master IoTA with a packet frame of the RFID request.

5. The method of claim 1 further comprising transmitting with the intercommunication radio of the master IoTA, a subsequent RFID request in response to a tag response received by the master IoTA from the RFID tag, and synchronizing a slave clock of the slave IoTA to a master clock of the master IoTA with a packet frame of the subsequent RFID request.

6. The method of claim 1 further comprising transmitting by the intercommunication radio of the master IoTA a termination message in response to the controller of the master IoTA determining that no further transmissions of RFID commands are required.

7. The method of claim 1 wherein configuring with the set of configuration parameters includes changing, in both the master IoTA and the slave IoTA, one of a respective frequency offset and a respective phase offset.

8. The method of claim 1 wherein configuring with the set of configuration parameters includes changing, in both the master IoTA and the slave IoTA, a polarization setting of the respective PAP.

9. The method of claim 1 further comprising receiving by the master IoTA, a tag response from the RFID tag, in response to the RFID command received by the RFID tag.

10. A system for protocol layer coordination of wireless energy transfer systems comprising:
    a first Internet of Things Access Point (IoTA) of a plurality of IoTAs, wherein each of the plurality of IoTAs comprise a controller in communication with a Power Access Point (PAP), an intercommunication radio and a Radio Frequency Identification (RFID) transceiver, the intercommunication radio configured to communicate between at least two IoTAs, and the RFID transceiver configured to communicate with the RFID tag;
    a second IoTA of the plurality of IoTAs, physically separated from the first IoTA; and
    an RFID tag configured to be energized by the respective PAP of at least one of the plurality of IoTAs, wherein:
    the first IoTA is configured to transmit with a first intercommunication radio of the first IoTA to the second IoTA, a set of configuration parameters to configure a second PAP and a second RFID transceiver of the second IoTA to match a configuration of a respective first PAP and a respective first RFID transceiver of the first IoTA,
    the first IoTA is configured to transmit with a first intercommunication radio of the first IoTA, an RFID request to the second IoTA,
    the second IoTA is configured to synchronize a second clock of the second IoTA to a first clock of the first IoTA using a packet frame of the RFID request, and
    the first RFID transceiver and the second RFID transceiver are configured to transmit a respective RFID command to the RFID tag in response to the RFID request.

11. The system of claim 10 wherein the set of configuration parameters configure the respective RFID transceiver of each of the plurality of IoTAs, and comprise at least one of a Backscatter-Link Frequency parameter, a Miller parameter and a Tari parameter.

12. The system of claim 10 wherein the set of configuration parameters configure the respective PAP of each of the plurality of IoTAs, and comprise one of a respective frequency offset and a respective phase offset.

13. The system of claim 10 wherein the first IoTA is defined by a pre-defined ordering of the plurality of IoTAs.

14. The system of claim 10 wherein the first IoTA is defined by an arbitration of the plurality of IoTAs.

15. The system of claim 10 wherein each of the plurality of IoTAs is sequentially defined as the first IoTA based on a pre-defined sequence.

16. The system of claim 10 wherein the set of configuration parameters comprises a respective polarization setting for each of the plurality of IoTAs.

17. The system of claim 10 wherein the master IoTA is configured to receive a tag response from the RFID tag, in response to the RFID command received by the RFID tag.

18. A system for protocol layer coordination of wireless energy transfer systems comprising:
    a first Internet of Things Access Point (IoTA) of a plurality of IoTAs, wherein each of the plurality of IoTAs comprise a controller in communication with a Power Access Point (PAP), an intercommunication radio and a Radio Frequency Identification (RFID) transceiver, the intercommunication radio configured to communicate between at least two IoTAs, and the RFID transceiver configured to communicate with the RFID tag;
    a second IoTA of the plurality of IoTAs, physically separated from the first IoTA; and
    an RFID tag configured to be energized by the PAP of at least one of the plurality of IoTAs, wherein:
    the first IoTA is configured to transmit with a first intercommunication radio of the first IoTA to the second IoTA, a set of configuration parameters to configure a second PAP and a second RFID transceiver of the second IoTA to match a configuration of a respective first PAP and a respective first RFID transceiver of the first IoTA, the first IoTA and the second IoTA are configured to receive a tag response from the RFID tag, wherein the RFID tag transmits the tag response in response to an RFID command received by the RFID tag from at least one of the plurality of IoTAs, and the first IoTA is configured to receive the tag response from the second IoTA with the first intercommunication radio, and to analyze the respective tag response received from the RFID tag and from the second IoTA with a first controller of the first IoTA, to determine a result.

19. The system of claim 18 wherein first IoTA is configured to transmit, with the first intercommunication radio, a subsequent RFID request to the second IoTA based on the result.

20. The system of claim 19 wherein each of the plurality of IoTAs are configured to transmit a subsequent RFID command to the RFID tag based on the subsequent RFID request.

* * * * *